United States Patent

Pirahesh et al.

[11] Patent Number: 5,960,426
[45] Date of Patent: Sep. 28, 1999

[54] DATABASE SYSTEM AND METHOD FOR SUPPORTING CURRENT OF CURSOR UPDATES AND DELETES FROM A SELECT QUERY FROM ONE OR MORE UPDATABLE TABLES IN SINGLE NODE AND MPP ENVIRONMENTS

[75] Inventors: Mir Hamid Pirahesh; David E. Simmen; Tuong Chanh Truong, all of San Jose, Calif.

[73] Assignee: International Business Machines Corporation, Armonk, N.Y.

[21] Appl. No.: 08/884,246

[22] Filed: Jun. 30, 1997

[51] Int. Cl.[6] ............................................. G06F 17/00
[52] U.S. Cl. .................................. 707/3; 707/1; 707/2
[58] Field of Search .................................. 395/671, 709, 395/335; 345/331; 707/1, 3, 10, 103, 2

[56] References Cited

U.S. PATENT DOCUMENTS

| | | | |
|---|---|---|---|
| 5,220,665 | 6/1993 | Coyle, Jr. et al. | 395/671 |
| 5,339,389 | 8/1994 | Bates et al. | 345/331 |
| 5,574,900 | 11/1996 | Huang et al. | 707/1 |
| 5,627,979 | 5/1997 | Chang et al. | 395/335 |
| 5,640,555 | 6/1997 | Kleewein et al. | 707/10 |
| 5,671,403 | 9/1997 | Shekita et al. | 707/3 |
| 5,696,974 | 12/1997 | Agrawal et al. | 395/709 |
| 5,706,505 | 1/1998 | Fraley et al. | 707/103 |
| 5,768,577 | 6/1998 | Kleewein et al. | 707/10 |
| 5,857,180 | 1/1999 | Hallmark et al. | 707/2 |

*Primary Examiner*—Wayne Amsbury
*Assistant Examiner*—Thuy Pardo
*Attorney, Agent, or Firm*—Gray Cary Ware Freidenrich

[57] ABSTRACT

A database system and method provide support for a positioned data set modification operation on a collection of data sets involved in a data set query operation, in which the data set modification operation is based on the position of a query execution iterator. At query compile time, the database system generates an iterator position retrieval function and a data set modification function for each data set involved in the query operation. At query execution time, the database system invokes each of the iterator retrieval functions until the iterator position retrieval function for a current open data set returns the current the position of the query execution iterator on that data set. The database system then invokes each of the data set modification functions until the data set modification function for the current open data set performs a data set modification operation at the current position of the query execution iterator specified by the iterator position retrieval function. The system and method may be implemented on single node systems and on multi-node shared-nothing parallelism architectures.

18 Claims, 6 Drawing Sheets

DATABASE SYSTEM AND METHOD FOR SUPPORTING CURRENT OF CURSOR UPDATES AND DELETES FROM A SELECT QUERY FROM ONE OR MORE UPDATABLE TABLES IN SINGLE NODE AND MPP ENVIRONMENTS

BACKGROUND OF THE INVENTION

The present invention is directed generally to the field of automated database systems. More particularly, the invention relates to a database management system providing support for database queries on multiple data sets. Still more particularly, the invention concerns a strategy for supporting data record updating and deleting based on the position of an iterator, such as a cursor, where the data records span multiple database tables. The database tables may be partitioned or non-partitioned.

Database management systems are well known. These systems are advantageously utilized to provide rapid access to large volumes of data that are stored and maintained in a digital processing system. A relational database management system (RDBMS) is a computer database management system that uses relational techniques for storing and retrieving data. Relational databases are computerized information storage and retrieval systems in which data in the form of tables (formally denominated "relations") are typically stored for use on disk drives or similar mass data stores. A table includes a set of rows (formally denominated "tuples" or "records") spanning several columns (formally denominated "attributes"). Each column in a table includes "restrictions" on the data contents thereof and may be designated as a primary or foreign key. Reference is made to C. J. Date, *An Introduction to Database Systems*, 6th edition, Addison-Wesley Publishing Co. Reading, Mass. (1995) for an comprehensive general treatment of the relational database art.

An RDBMS is structured to accept commands to store, retrieve, update and delete data using high-level query languages such as the Structured Query Language (SQL). The term "query" denominates a set of commands for retrieving data from a stored database. These commands may be entered interactively by a user, or may be executed as part of an application program. In the latter case, the SQL statements are physically "embedded" within the application program source code, so as to be intermixed with the statements of the host language. The SQL standard has been promulgated by the International Standards Association since 1986. Reference is made to the SQL-92 standard "Database Language SQL" published by the ANSI as ANSI X3.135-1992 and published by the ISO as ISO/IEC 9075:1992 for the official specification of the 1992 version of the Structured Query Language. Reference is also made to James R. Groff et al. (*LAN Times Guide to SQL*, Osborne McGraw-Hill, Berkeley, Calif., 1994) for a lucid treatment of SQL-92.

SQL queries can be designed to retrieve only a single data item from a database table or a set of multiple data items. In the latter operation, a mechanism is required for sequentially accessing the database table one row at a time. The mechanism that has evolved for this purpose is a cursor. A cursor is an iterator construct used to scan and process a set of data (i.e., records, keys, tuples, etc., satisfying certain conditions), one at a time. RDBMSs implement two types of cursors: user cursors and system cursors.

A user cursor directly corresponds to a cursor defined in a user application using an SQL DECLARE "x" CURSOR statement. This statement defines a cursor called x having an associated table expression for performing an operation on the data table. A looping FETCH statement is then used to retrieve data one row at a time from the resulting set and assign the data to specified variables. UPDATE and DELETE are separate dataset modification operations which can be performed as the cursor iterates from row to row, provided the cursor is defined as being updatable in the DECLARE statement.

System cursors are defined by the RDBMS and used internally to produce the results needed to satisfy the user's query. One or more system cursors might be used to produce the output corresponding to a single user cursor. An access path is used to implement a system cursor. The most common access paths are sequential scans of a table's data pages (a table scan cursor (TSC)) and range scans on a B+-tree index (an index scan cursor (ISC)).

Both system cursors and user cursors might operate over permanent data as well as temporary data (e.g., intermediate or final results stored in temporary tables or work files). Even if a user cursor requires accessing only a single table's data, multiple system cursors might have to be used, due to the exploitation of query processing techniques like index ANDing/ORing.

As indicated, in SQL, users can issue UPDATE or DELETE statements using an existing cursor position to identify the record to update or delete. These "positioned" UPDATE and DELETE statements are achieved through the CURRENT OF CURSOR semantics in SQL.

For example, consider the following SQL statements that (1) declare an updatable cursor, (2) open the cursor, (3) perform a FETCH operation and then (4) perform an UPDATE or DELETE operation in a row where the cursor is currently positioned:

declare X cursor for select [*] from [table/view] where [predicates] for update;

open X;

fetch X;

update [Table/View] set [columns=new values] where current of X; or delete from [Table/View] where current of X;

Note that "current of X" identifies the current record on which the Cursor X is positioned. The UPDATE and DELETE SQL statements instruct the DBMS to perform an update or delete operation on that record, respectively. It should also be noted that the FETCH operation is separate from the UPDATE and DELETE operations. The FETCH operation controls the cursor by changing its position in the table. The UPDATE and DELETE operations are passive in the sense that they do not control the cursor. They must, however, obtain information about the cursor's position in order to perform their operations.

The challenge in CURRENT OF CURSOR UPDATES and DELETES is getting information to the UPDATE and DELETE operations about the position of the record that is currently associated with the cursor X in the database. In conventional DBMSs, a predetermined global data area (GDA) exists and stores information about the table on which a cursor is positioned. This information is used for processing the UPDATE/DELETE CURRENT of CURSOR commands. At SQL statement preparation time (i.e., compile time), the table being updated/deleted is identified and the memory location of its table descriptor is stored in the GDA as a table descriptor pointer. The table descriptor is a data structure that stores table state information as a table is accessed during a query. When a record is fetched from the table, the record ID information is recorded by the FETCH operation in the table descriptor. Upon executing a CURRENT of CURSOR UPDATE/DELETE SQL statement, the DBMS will consult the table descriptor pointer in the GDA to locate the table descriptor, and then obtain the correct table ID and record ID from the table descriptor to perform the required update/delete operation. Moreover, if no data in $T_1$ satisfies "C1>0, " the cursor X may be positioned in $T_2$ when the first responsive data set is found.

Performing CURRENT of CURSOR UPDATES/DELETES on a database becomes problematic when dealing with multiple tables. SQL permits users to define a VIEW of a UNION of database tables. Creating a VIEW of a UNION can be useful in many situations. For example, it can be used when historical data stored in many tables is required for analysis.

A UNION of database tables presents special problems for CURRENT of CURSOR UPDATES and DELETES. In that case, the record that cursor X is positioned on may belong to any of the tables that are part of the UNION. The question is how to correctly identify the table where the current record originated.

Assume, for example, that there are two tables, T1(C1, C2) and T2(C1,C2), where C1 and C2 refer to columns in each table. Assume further that a VIEW representing a UNION of column 1 of T1 and T2 is declared, as follows:

create view V1(C1) as (select C1 from T1
    union all
    select C2 from T2);

A cursor X can now be declared on the VIEW V1, and used to FETCH data and UPDATE or DELETE from V1 where CURRENT of CURSOR, as follows:

/* Open a cursor on the view */
  declare X cursor for SELECT*FROM V1 WHERE C1>0
    for update;
  open X;
  fetch X;
  update from V1 set C1=1 where current of X; or
  delete from V1 where current of X;

In the foregoing example, the record X is positioned on may belong to Table T1 or Table T2 in the VIEW V1, depending on the manner in which the data sets in T1 and T2 satisfy the predicate criterion "C1>0". Moreover, in an MPP (shared nothing) database system, each table may be partitioned over a group of processing nodes having unique node-IDs. So, not only the record ID changes with each fetch, but the table-ID and node-ID may also change. The existing method of statically determining the update table to record in the GDA is no longer adequate. A better method is desirable for determining the changing table-ID, node-ID and record-ID.

A similar problem exists for positioned update and delete operations on a grouping of data sets resulting from a JOIN operation:

For example, given table T1 and T2 as defined previously, and a view V1 defined as:

create view V1(C1, C2) as (select a.C1, b.C1 from T1, T2);

a cursor X can be declared on the view V1, and used to FETCH and UPDATE or DELETE from VI as follows:

declare X cursor for select*from V1 for update;
  open X;
  fetch X;
  update from V1 set C1=10, C2=20 where current of X; or
  delete from V1 where current of X;

In the foregoing example, the record X is positioned belongs to both Table T1 and Table T2 in the VIEW V1. In order to perform the positioned update and delete, the table-IDs and record-IDs of both TABLE T1 and TABLE T2 must be determined in an efficient manner similar to the UNION scenario.

Accordingly, a need exists for a database management system that supports positioned operations, such as UPDATE operations and DELETE operations, on a grouping of data sets, such as a UNION or a JOIN of database tables, or the like, in a database. What is required is a database management system that provides a method for determining the correct position, such as the table-ID, node-ID, and record-ID, associated with an iterator, such as an application cursor, and providing that information to an updatable operation such as an UPDATE operation or a DELETE operation, in an efficient manner with minimal processing overhead. It would be desirable to implement the foregoing enhancements in both a single node database system and a multi-node database system, such as a Shared-Nothing (SN) Parallelism Environment.

SUMMARY OF THE INVENTION

It is a principal object of the present invention to provide a database management system and method in which positioned UPDATE and DELETE operations are supported on a grouping of data sets in a database.

It is a further object of the present invention to provide a database management system and method in which positioned UPDATE and DELETE SQL operations are supported on a selected grouping of database tables, such as a table UNION or a table JOIN.

It is a still further object of the present invention to provide a database management system and method for determining the correct position, such as the table-ID, node-ID and record-ID, associated with an iterator, such as an application cursor, and providing that information to an updatable operation such as an SQL UPDATE operation or an SQL DELETE operation, in an efficient manner with minimal processing overhead.

It is yet another object of the present invention to implement the foregoing objects in both a single node database system and a multi-node database system, such as a Shared-Nothing (SN) Parallelism Environment.

In accordance with the foregoing objectives, a database system and method are disclosed which provide support for a positioned data set modification operation on a collection of data sets involved in a data set query operation, in which the data set modification operation is based on the position of a query execution iterator. At compile time for the SELECT query, the database system records the pointers to the record-ID, node-ID, and table-ID of each data set in the GDA of the SELECT query's execution plan. At compile time for the UPDATE or DELETE SQL statement, the database system generates an iterator position retrieval function and a data set modification function for each data set involved in the SELECT query. At query execution time, the database system invokes each of the iterator position retrieval functions until the record-ID, node-ID, and table-ID associated with the current position of the iterator is returned. To do this, the iterator position retrieval function examines the GDA of the SELECT query's execution plan. If a retrieval function cannot locate the iterator position for its data set from the pointers in the SELECT query's GDA, then a no record indicator (null value) will be returned. When the retrieval function of the data set currently pointed to by the iterator is invoked, the record-ID of the record where the iterator is currently positioned will be returned. The database system then invokes each of the data set modification functions until the data set value at the record position specified by the iterator position retrieval function is modified. The system and method may be implemented on single node systems, and also on multi-node, shared-nothing parallelism architectures.

BRIEF DESCRIPTION OF THE DRAWINGS

The objects, advantages and features of the present invention will be more clearly understood by reference to the following detailed disclosure and the accompanying drawing in which.

DETAILED DESCRIPTION OF THE PREFERRED EMBODIMENTS

Figure 1:
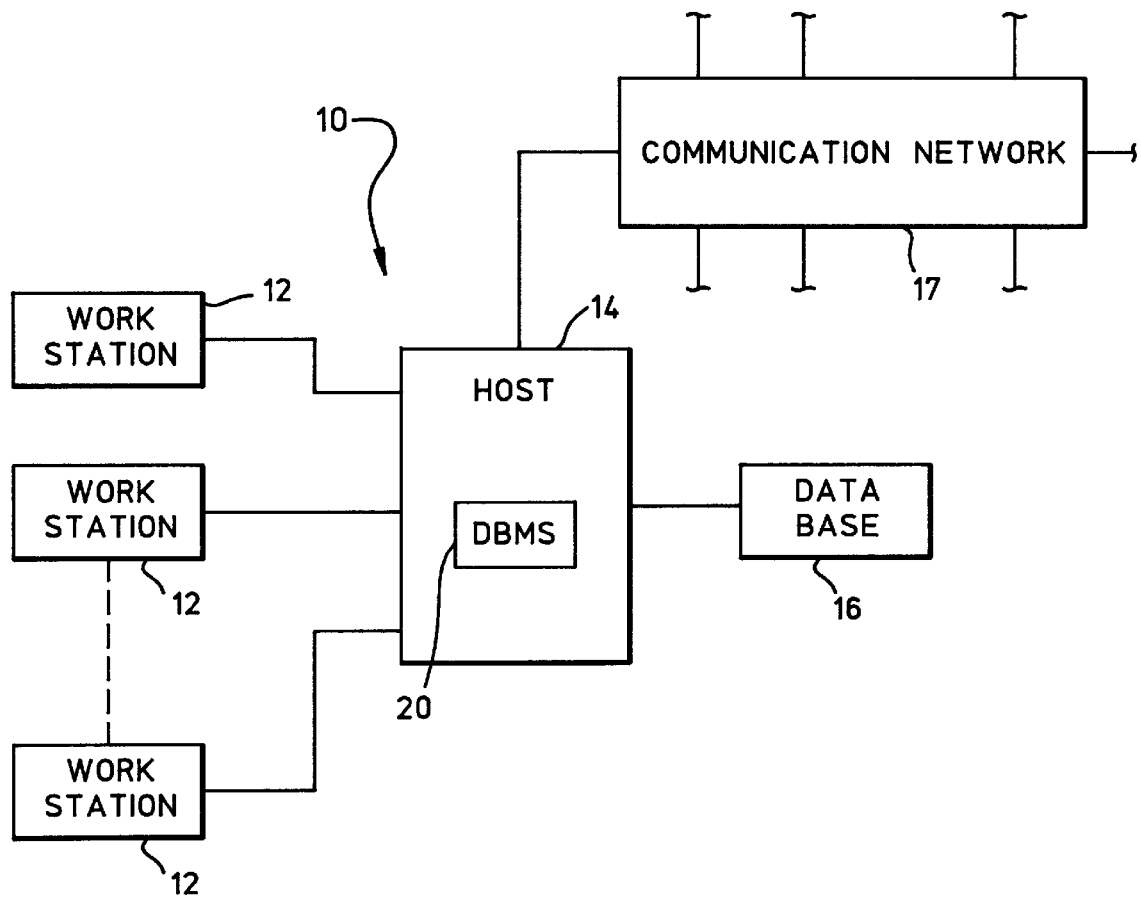
FIG. 1 is a block diagram showing hardware and software components of a database system in which this invention is practiced.

FIG. 1 illustrates a database system 10 which the present invention may be practiced. This exemplary configuration is described for illustrative purposes only and it should be appreciated and understood that the system and method of this invention can be embodied in a database system in many useful configurations, including the arrangement shown in FIG. 1. The database system 10 includes one or more interactive work stations 12, which are all coupled to a host processor 14. The host processor is in turn coupled to a database 16 and a communication network 17. The interactive work stations 12 may be smart or dumb terminals, and the host processor 14 may be a general purpose programmable computer. The database 16 includes a plurality of data files residing on a data storage medium, such as a hard disk data storage system, controlled by disk management and file management software or the like.

Those skilled in the art will appreciate that while FIG. 1 shows a particular system configuration, a similar system comprised of individual computer clients coupled via a local area network to a network server may also be utilized. As can be seen, each operator of an interactive work station 12 may search, access, or alter data contained within the database 16 by means of a database management system (DBMS) 20 which is embodied in the host processor system 14 as a software program written in a high level language such as "C" or the like. This software program is compiled and linked into one or more executable binary modules containing a plurality of machine readable instructions for performing the functions implemented by the DBMS 20. The DBMS 20 is preferably a relational database (RDBMS) which builds a relational model of the data stored in the database 16, and which allows users to access the database 16 via SQL commands.

One of the functions of the DBMS 20 is to process SQL queries input by users at the work stations 12 and compile them into a query execution plan. As is known in the art, this compilation process includes a lexing step, a parsing and semantic checking step, and a conversion to an internal representation denoted the Query Graph Model or QGM. The QGM is a command data structure that summarizes the semantic relationships of the query for use by the DBMS's query translator and optimizer components. Reference is made to U.S. Pat. No. 5,367,675 of Cheng et al. and U.S. Pat. No. 5,276,870 for a discussion of useful QGM implementation techniques.

Figure 2:
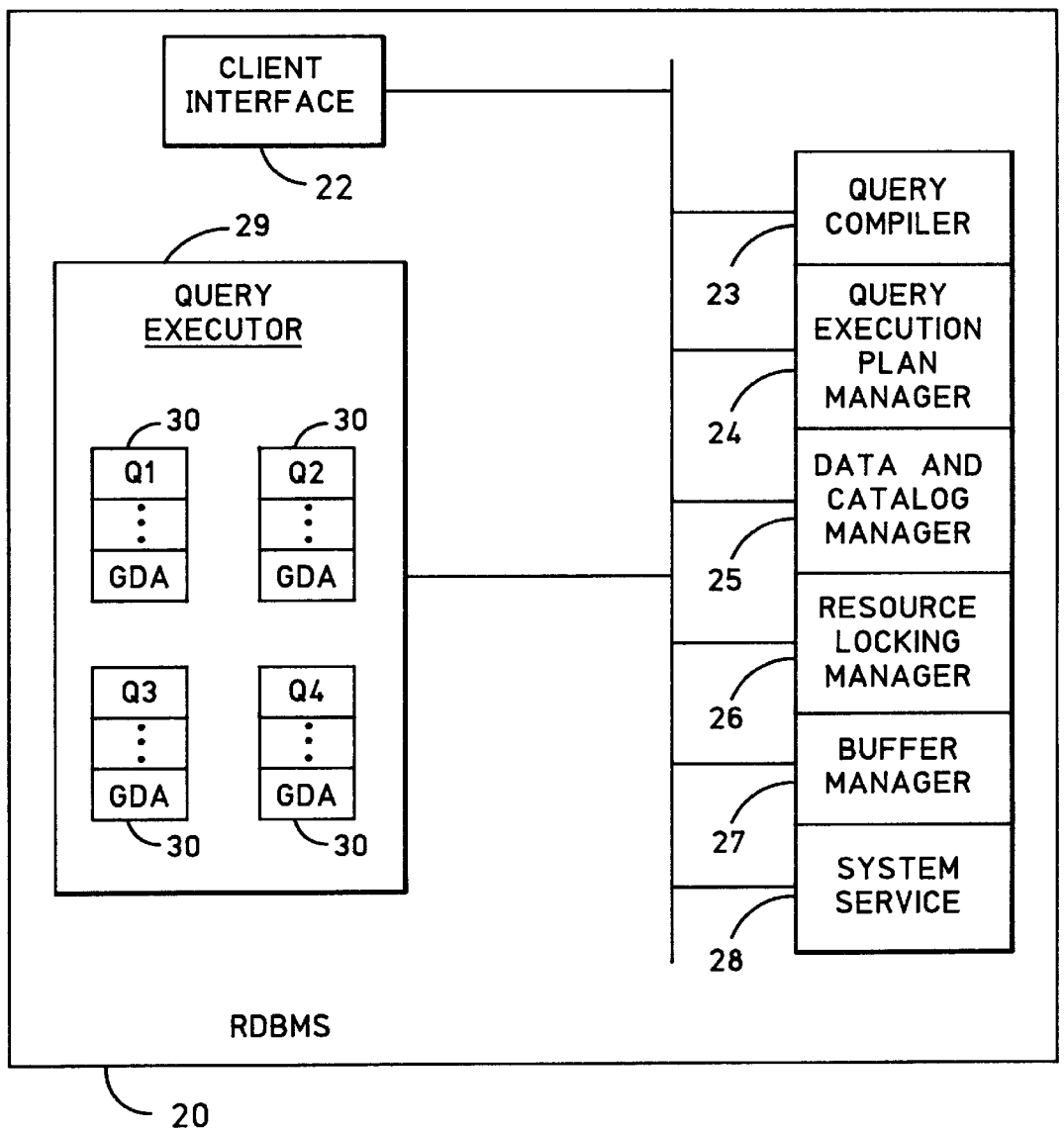
FIG. 2 is a block diagram showing details of components of the database system of FIG. 1.

Referring now to FIG. 2, the DBMS 20 is shown with one of the work stations 12 providing a client interface 22 to the system for processing user queries. The DBMS 20 includes a query compiler 23, a query execution plan manager 24, a data and catalog manager 25, a resource locking manager 26, a buffer manager 27, and system services 28. A query executor 29 manages one or more executing instances of query execution plan 30 each having its own GDA.

Pointers to the identification information of each of the updatable data sets are recorded in the Global Data Area (GDA) of the select query execution plan at the time the select query is compiled.

When a SELECT query statement is identified as updatable, the record identification information associated with each base table (data set) tuple is flowed together with the data requested by the application as a row in the system. This identification information is not available to the application; it is available only for internal use by the database system.

When a positioned modification operation is requested against the SELECT query operation, the modification operation's execution plan is able to obtain the identification information from the select query operation's GDA because of the SQL cursor name given with the modification request. The process of copying the identification information is done by the RIDC (Record ID Copy) function. An RIDC function is generated for each Table involved in the modification operation. As a result, the positioned modification operation's execution plan has all the information needed to perform the operation. The power of the RIDC function design is that it allows for the database system to model a positioned access as a special access path for each updatable data set. Once the identification information is copied, the modification operation works as it would normally would on a searched modification.

Consider the following modification of a dataset UNION:

/* UNION VIEW */
create view V1(C1) as (select C1 from T1
  union all
  select C1 from T2);
The following SQL statements are issued:
/* Open a cursor on the view */
declare X cursor for select*from V1 for update;
open X;
fetch X;
update from V1 set C1=1 where current of X;

The execution plan tree for "select*from V1" looks like:

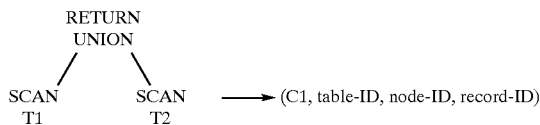
→ (C1, table-ID, node-ID, record-ID)

Note that the SCAN of each data set T1, T2 will retrieve the table-ID, node-ID, record-ID along with column C1 from each data set.

Figure 3:
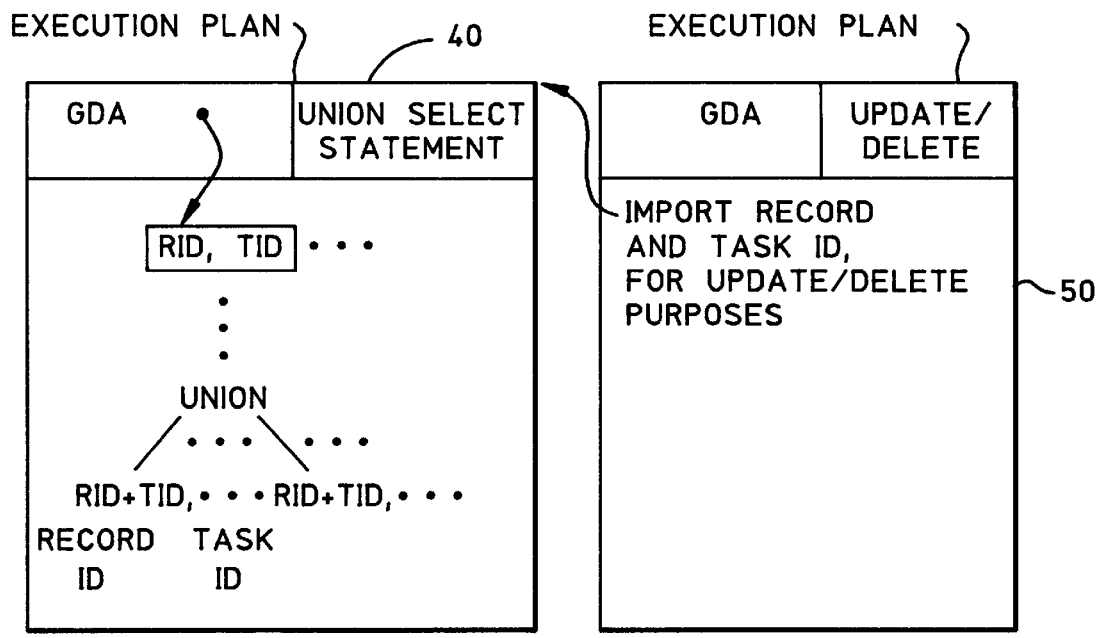
FIG. 3 is a block diagram showing query execution plans for a UNION operation in accordance with present invention.

The execution plan tree for "update from V1 set C1=1 where current of X" looks like:

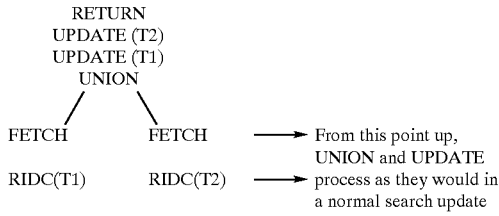
→ From this point up, UNION and UPDATE
→ process as they would in a normal search update The foregoing example is graphically illustrated in FIG. 3, which shows the select query execution plan 40 and the update/delete execution plan 50.

Consider the following modification of a dataset JOIN:
/* JOIN VIEW */
create view V2(C1, C2) as (select T1.C1, T2.C1 from T1, T2)
The following SQL statements are issued:
/* Open a cursor on the view */
declare X cursor for select*from V1 for update;
open X;
fetch X;
update from V1 set C1=1, C2=2 where current of X;
The execution plan tree for "select*from V1" may look like:

RETURN
JOIN
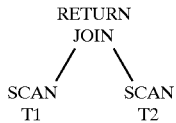

The execution plan tree for "update from V1 set C1=1 where current of X" may look like:

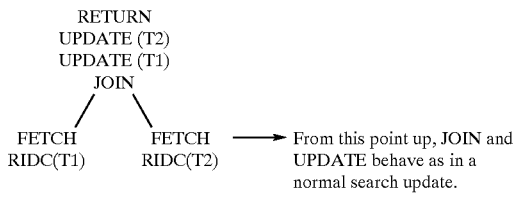
→ From this point up, JOIN and UPDATE behave as in a normal search update.

Figure 4:
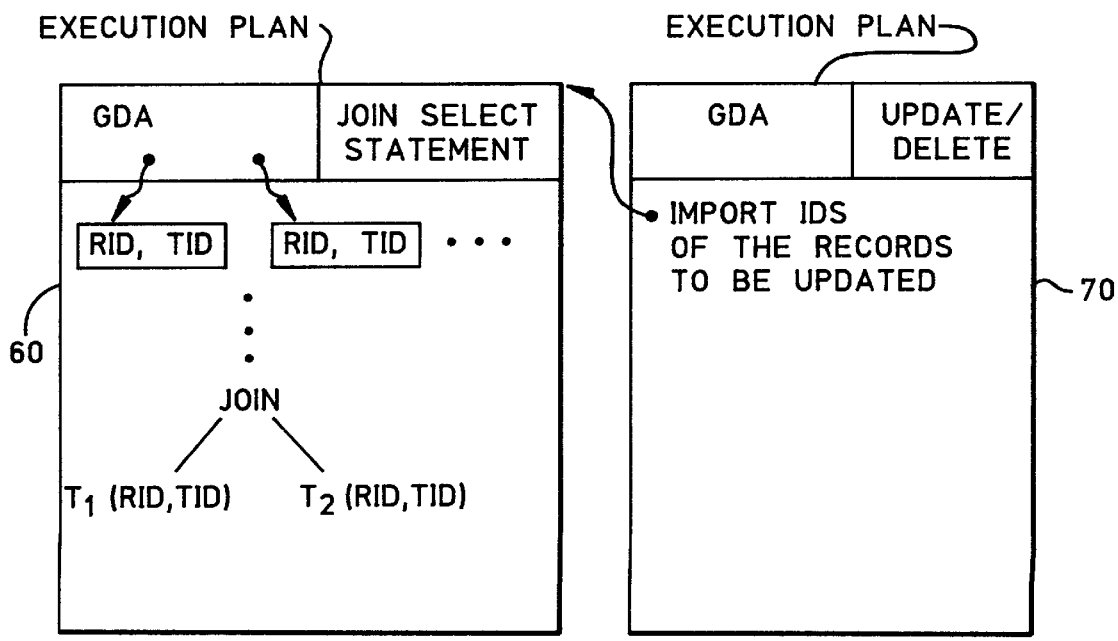
FIG. 4 is a block diagram showing query execution plans for a JOIN operation in accordance with the present invention.

The foregoing example is graphically illustrated in FIG. 4, which shows the select query execution plan 60 and the update/delete execution plan 70.

In accordance with the present invention, in order to ensure UPDATES/DELETES are made on the correct table in an efficient manner, the DBMS 20 builds multiple copies of the RIDC function, one for each updatable/deletable table involved in the query. When the UPDATE/DELETE operation is performed following a FETCH operation, each RIDC function is invoked sequentially to examine the cursor's R-ID, T-ID pointer in the query execution plan's GDA, and compare it with its own associated table ID. If they match, the RIDC function returns the current R-ID and T-ID information. If the RIDC function's table ID does not match that of the cursor, the RIDC function returns a null value for the R-ID, hence preventing any UPDATE/DELETE on that table.

The UPDATE/DELETE operation is performed in accordance with the present invention using these multiple UPDATE/DELETE functions, one of which is built at modification plan compile time for each updatable/deletable table in the query, such as a UNION or a JOIN. At query execution time, the RIDC function for the current table passes the current R-ID corresponding to the cursor to each UPDATE/DELETE function in sequence. Upon invocation, each UPDATE/DELETE function will check to see if the record to be UPDATED/DELETED belongs to the table for which the function is to perform the UPDATE/DELETE. If the answer is yes, the UPDATE/DELETE function will perform the operation on that record; otherwise, the UPDATE/DELETE function passes control to the next UPDATE/DELETE function in the sequence. This process goes on until the record UPDATE/DELETE operation is executed. The invention ensures that one and exactly one of the UPDATE/DELETE function will actually perform the UPDATE/DELETE of the record belonging to its associated data set.

The logic/data flow of the UPDATE/DELETE CURRENT OF CURSOR can thus be viewed as follows:

$$\text{RIDC} \rightarrow \text{UP/DEL(T1)} \rightarrow \text{UP/DEL(T2)} \rightarrow \cdots \rightarrow \text{UP/DEL(Tn)}.$$

Figure 5:
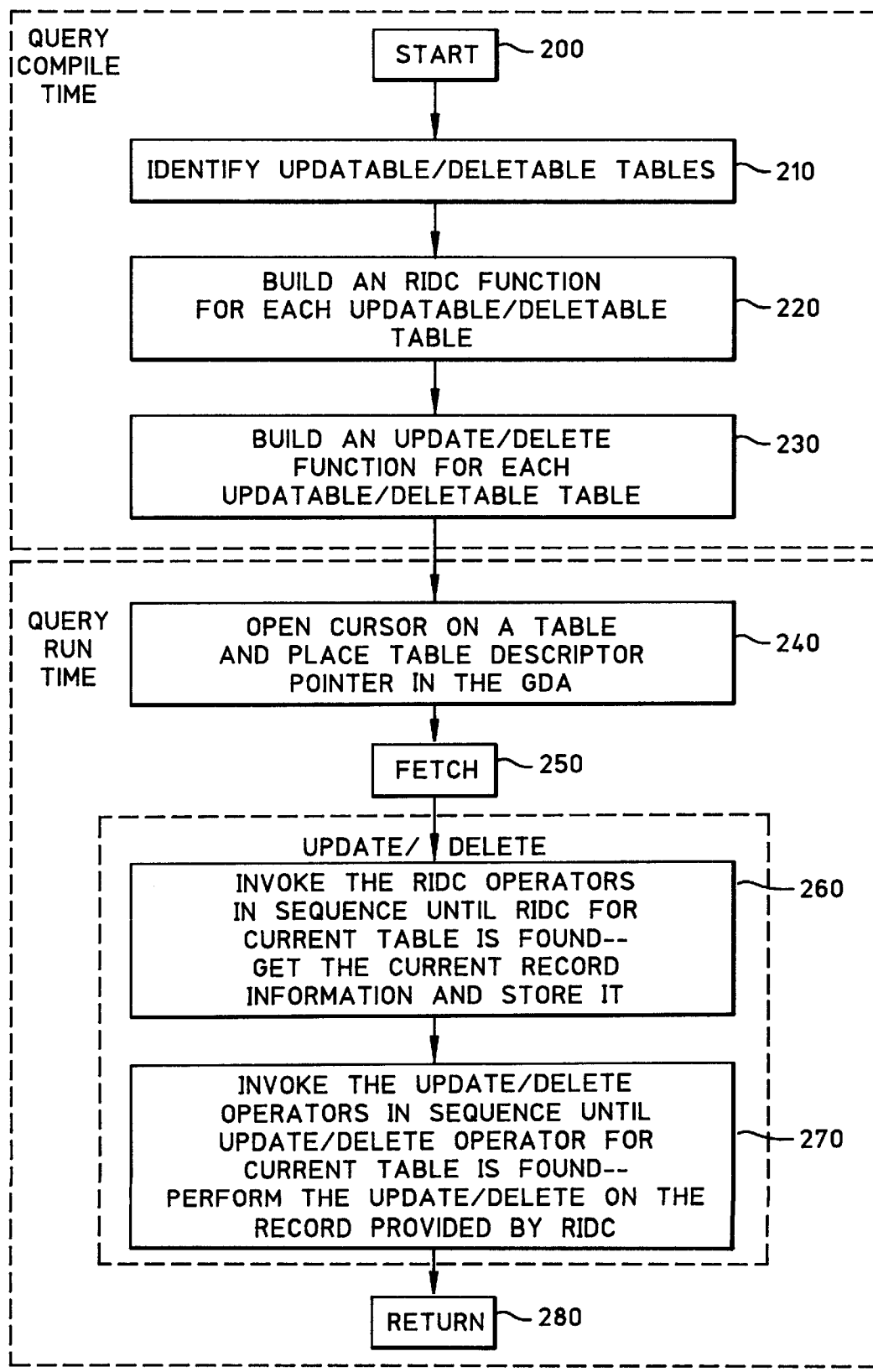
FIG. 5 is a flow chart diagram showing the operation of the database system of FIG. 1 according to the invention, in a single node environment.

Referring now to FIG. 5, the foregoing CURRENT OF CURSOR UPDATE/DELETE operation for multiple tables is illustrated by way of a flow chart diagram. The process begins with the query compilation phase at initial step 200. In step 200, the DBMS receives the query and performs its usual lexing, parsing and semantic checking, following which a QGM of the query is generated. In the next step 210, the DBMS consults the QGM to identify all of the updatable/deletable tables involved in the query statement. In step 220, the DBMS builds an RIDC function for each of the updatable/deletable tables. In step 230, the DBMS builds an UPDATE/DELETE functions for each of the updatable/deletable tables. The query statement is now ready for execution.

In step 240, the OPEN CURSOR statement is executed to prepare the SELECT query for application access. In step 250, the FETCH operation is performed against the SELECT query's cursor to return a record to the application. This will result in the pointers in the SELECT query's GDA pointing to the identification information of the base data set(s) record(s) that make up the record being returned to the application. In step 260, the RIDC functions are invoked so that each can copy the record identification information of its associated data set from the SELECT query's GDA to a memory space used by the UPDATE/DELETE function. In step 270, the UPDATE/DELETE functions are invoked in sequence until the one corresponding to the current open table is executed. This UPDATES/DELETES the current record identified by the RIDC function. The process continues in step 280 by returning to a previous query execution step. This will typically be either a FETCH of a new record in the current table, or an opening of the next updatable/deletable table in the event that an end-of-table (EOT) condition on the current table is reached. Various error procedures might also be invoked in the event of a problem in the UPDATE/DELETE operation.

The foregoing query execution process repeats itself until all of the updatable/deletable tables have been evaluated and all records matching the search criteria have been UPDATED/DELETED. It will be understood that other steps of a conventional nature are also performed during the query compile and execution stages. These steps are purposely omitted from the present discussion in order to focus on the steps which are believed necessary to a complete understanding of the operation of the invention in its preferred embodiment.

The present invention offers further advantages when implemented in a Shared-Nothing Parallelism (SNP) Environment. In a shared-nothing architecture database management system (SN-DBMS), a table's data set is typically divided into 2 or more partitions, each managed by a separate executing instance of the SN-DBMS, known as node. A single computer system can have one or more SN-DBMS nodes, and a parallel SN-DBMS environment can involve two or more nodes on one or more computer systems.

With an SN-DBMS, a scan on a table T requires that the scan logic be distributed to all the nodes that hold a partition of T. When an application issues a "SELECT*FROM T" SQL statement, the statement is processed in the context of the node that the application is connected to, known as the coordinator node. The scan logic is distributed to all the relevant nodes, and each returns its partition of data to the coordinator node. The coordinator node in turn collects and returns the data to the application.

Figure 6:
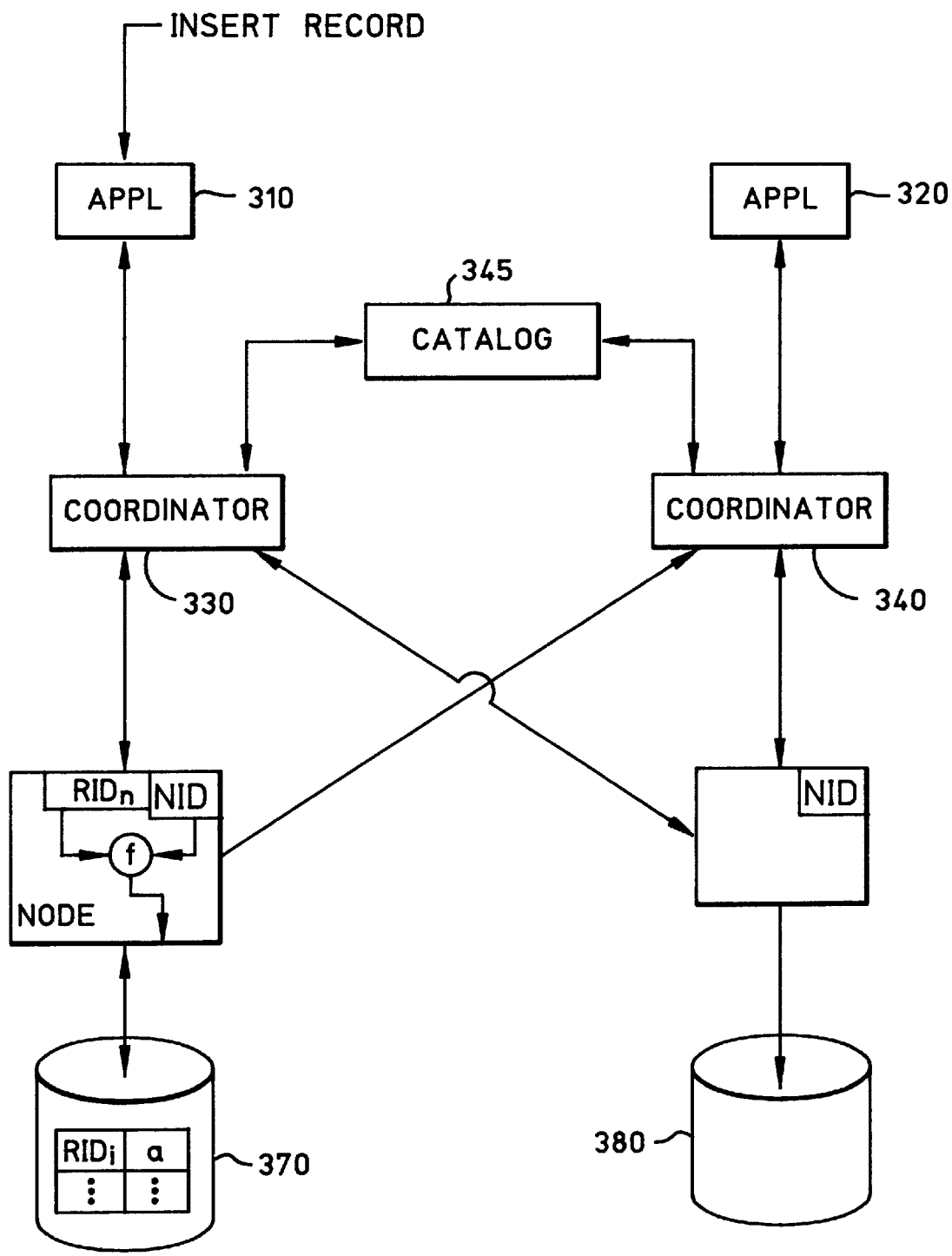
FIG. 6 is a block diagram showing components of a multi-node, shared-nothing parallelism database architecture.

FIG. 6 illustrates an SN-DBMS system 300. A pair of application programs 310 and 320 communicate with respective coordinator nodes 330 and 340. The coordinator nodes 330 and 340 communicate with the Catalog 345, which includes all of the various schemes and mappings used by the database. These include such objects as tables, indexes, users, integrity rules, security rules, as well as the table partition information and node assignments. Each coordinator node 330 and 340 communicates with downstream nodes, two of which are illustrated by reference numerals 350 and 360. It will be understood that, while single lines are shown connecting the various nodes, both control and data information is passed between the nodes. Each of the nodes can have access to a storage device to store table partitions for which they are responsible. Two such storage devices are illustrated in FIG. 4 by reference numerals 370 and 380.

A problem introduced by SN parallelism in a CURRENT OF CURSOR UPDATE/DELETE on a UNION or JOIN is that the cursor position of the application can successively point to records from different nodes, depending on which partition the record returned to the application belongs. This poses a problem when an application issues a CURRENT OF CURSOR UPDATE/DELETE in an SN parallel DBMS environment at the coordinator node, because the UPDATE/DELETE logic needs to be distributed to the node where the current record originates.

In accordance with the present invention, for an SN Parallel DBMS, the RIDC copy function is modified to extend the record ID information returned thereby to include the node-ID to which the record belongs. This allows proper identification of the correct node where the record resides, based on a given record ID. The introduction of a node-ID, when coupled with the record-ID and the table-ID, will enable the database system to uniquely identify a record in a database system in an MPP, Shared Nothing environment. The table-ID uniquely identifies a given data set; the node-ID uniquely identifies a partition of the data set on a certain node; and the record-ID uniquely identifies a record within a partition of a data set. In a single node environment, there is only a single partition. As a result, the node-ID is constant and can be omitted.

As described above, in a single node system, when one of the UPDATE/DELETE functions receives a record identifier from the RIDC function, it checks to see if the record belongs to its associated table. If the table-ID matches its associated table ID, the record will be UPDATED/DELETED. Otherwise, the record identifier is passed on to the next UPDATE/DELETE operation that is associated with a different table.

In a multiple node SN system, a table is partitioned over a set of nodes that participate in the SN system. This set is a non-empty subset of all the nodes that participate in the SN system. Each table may be partitioned over any subset of nodes in the system (a subset of nodes is known as a node group).

Thus, in an SN system an operation against any table has to be performed at the nodes containing the partitions of that table. During query processing, records can be transferred one way from one set of nodes to another using a software mechanism which will be referred to as a Table Queue (TQ). TQ connections between nodes are established statically when the query is first processed. Records sent via TQ can be sent by different methods, as follows:

BROADCAST—record is sent to ALL receiving nodes of this TQ;

HASH DIRECTED—record value is hashed to determine a single node to which to send the record;

NODE DIRECTED—record ID is used to determine the node to which to send the record.

Extending the logic/data flow given above for the example above in the single node case, it can be seen that the same UPDATE/DELETE UNION query in an SN system can be implemented as follows:

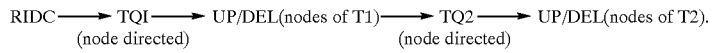

RIDC ⟶ TQI ⟶ UP/DEL(nodes of T1) ⟶ TQ2 ⟶ UP/DEL(nodes of T2).
      (node directed)                       (node directed)

The UP/DEL function is thus the same as the UP/DEL function in the single node care except that the R-ID/node information is passed through the TQs.

The foregoing logic/data flow works well in most cases, but a problem arises when table T1 is partitioned over a set of nodes that is not exactly the same set that table T2 is partitioned over. For instance, when T1 is partitioned over nodes (1, 2, 3), and table T2 is partitioned over nodes (4, 5) in a 5 node SN system. In that case, an UPDATE/DELETE of a UNION or JOIN of these two tables poses a special challenge because, in order to UPDATE/DELETE a record from table T2, that record must be sent though the UPDATE/DELETE operation of table T1. But, in a CURRENT OF CURSOR UPDATE, the record is sent based on the node where it originated, and the TQ logic connections from RIDC to UPDATE/DELETE(nodes of T1) do not include nodes 4 and 5. As such, the TQ logic is not able to send the record to nodes 4 or 5.

The solution to this problem is to extend the TQ logic such that when a record is to be sent through a TQ using the NODE DIRECTED method, and the TQ does not have a connection to that particular node, it will send the record to ANY one node with which it has a connection. Correctness is ensured because the UPDATES/DELETE (nodes of T1) function will pass the record on to the next UPDATES/DELETE(nodes of T2) so that the record will go to the correct node to which the T2 record belongs. This solution will work for an arbitrary number of tables in the union.

Figure 7:
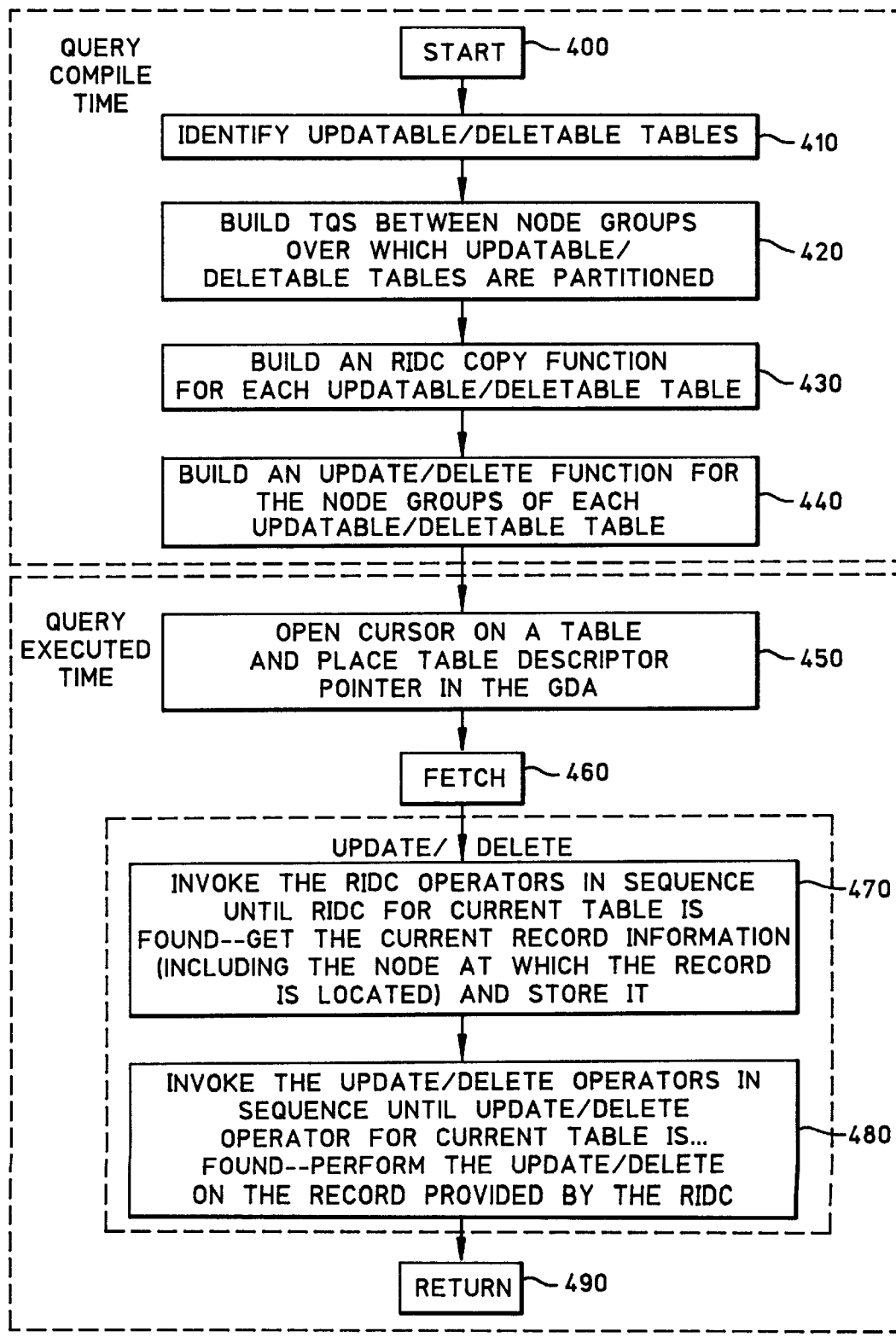
FIG. 7 is a flow chart diagram showing the operation of the database system of FIG. 1 according to the invention, in a multi-node shared-nothing parallelism environment.

Referring now to FIG. 7, the foregoing CURRENT OF CURSOR UPDATE/DELETE operation for multiple tables in an SN-DBMS is illustrated by way of a flow chart diagram. The process begins with the query compilation phase at initial step 400. In step 400, the SN-DBMS receives the query and performs its usual lexing, parsing and semantic checking, following which a QGM is of the query is generated. In the next step 410, the SN-DBMS consults the QGM to identify all of the updatable/deletable tables involved in the query statement. In step 420, the SN-DBMS builds the TQs between the node groups over which the updatable/deletable tables are partitioned. In step 430, the SN-DBMS builds an RIDC function for each of the updatable/deletable tables. In step 440, the SN-DBMS builds an UPDATE/DELETE function for the node groups of each of the updatable/deletable tables. The statement is now ready for query execution.

In step 450, the OPEN CURSOR statement is executed to prepare the SELECT query for application access. In step 460, the FETCH operation is performed against the SELECT query's cursor to return a record to the application. This will result in the pointers in the SELECT query's GDA pointing to the identification information of the base data set(s) record(s) that make up the record being returned to the application. In step 470, the RIDC functions are invoked so that each can copy the record identification information of its associated data set from the SELECT query's GDA to a memory space used by the UPDATE/DELETE function. In step 480, the UPDATE/DELETE functions are invoked in sequence until the one corresponding to the current open table is executed. This UPDATES/DELETES the current record provided by the RIDC function. The process continues in step 490 by returning to a previous query execution step. This will typically be either a FETCH of a new record in the current table, or an opening of the next updatable/deletable table in the event that an end-of-table (EOT) condition on the current table is reached. Various error procedures might also be invoked in the event of a problem in the UPDATE/DELETE operation.

The foregoing query execution process repeats itself until all of the updatable/deletable tables have been evaluated and all records matching the search criteria have been UPDATED/DELETED. It will be understood that other steps of a conventional nature are also performed during the query compile and execution stages. These steps are purposely left out of the discussion in order to focus on the steps which are necessary to disclose in order to understand the operation of the invention in its preferred embodiment.

The database operations described herein ARE facilitated by being able to uniquely identify records across the shared-nothing parallel architecture. For example, prior to performing the UPDATE or DELETE operations described in this invention, the record that is intended for modification, in effect the record that the cursor is positioned on, must be located by the system. The identification information must be unique with respect to all other records in the system, or the modification request will be ambiguous. Thus, for the shared-nothing architecture of FIG. 6, there must be provision for "globally unique" identifiers for records when they are inserted into the database.

The process of providing a globally unique identifier for a record in the shared-nothing architecture of the RDMS illustrated in FIG. 6 takes account of the autonomy of node processing. Thus, the "globally unique" identifier for records in the database that is accessed by the shared nothing architecture of FIG. 6 must be unique across the nodes of the shared-nothing system, as opposed to being unique only within a node. Preferably, each of the nodes 350, 360 is able to autonomously generate a record identifier that is unique across all nodes of the system of FIG. 6. Basic to this method is the use of a unique node identifier (NID) for each node of the shared-nothing system of FIG. 6 when the system is initially configured. Thus, the node ID (NID) of the node 350 is unique with respect to all other node IDs, including the node ID (NID) of the node 360. According to the invention, a globally unique identifier is generated for each record when the record is inserted into the shared-nothing database. This method makes use of the unique node identifier (NID) of the node through which the record is inserted. Assume, for example, that an INSERT record operation conducted by the application 310 results in a record being inserted in a table or a portion of a table stored responsibility of the storage 370 is the responsibility of the node 350, the record is inserted by way of the node 350. Preferably, a record row identifier ($RID_i$) which is unique within the node 350 is first generated, and then paired with the unique NID of the node 350. The pair of values NID and RID are applied to a deterministic function f, such as one which simply concatenates the bit representations of the NID and the RID. The record with a row ID ($RID_i$) that is unique within the shared-nothing system of FIG. 6 is then inserted into a table or a table portion stored at 370. Other examples of deterministic functions will be evident to those skilled in the art.

Accordingly, a database apparatus and method for supporting CURRENT OF CURSOR UPDATES and DELETES from a data set UNION or JOIN has been described. While various embodiments have been disclosed, it should be apparent that many variations and alternative embodiments would be apparent to those skilled in the art in view of the teachings herein. For example, the method of the invention applies equally well to single table UNION or JOIN updates. It is understood, therefore, that the invention is not to be in any way limited except in accordance with the spirit of the appended claims and their equivalents.

We claim:

1. A method for supporting a positioned data set modification operation on a partitioned data set involved in a data set query operation, in which the data set modification operation is based on the position of a query execution iterator and the data set is partitioned over two or more processing nodes into two or more data set partitions, the method comprising:

generating at query compile time, an iterator position retrieval function for each data set partition involved in the query operation;

generating at query compile time, a data set modification function specific to each data set partition involved in the query operation;

invoking at query execution time, each of said iterator retrieval functions until the iterator position retrieval function for a current open data set partition returns the current position of said query execution iterator on that data set partition; and invoking at query execution time, each of said data set modification functions until the data set modification function for said current open data set partition performs a data set modification operation at the current position of said query execution iterator specified by said iterator position retrieval function.

2. A method for supporting a positioned data modification operation on a union of tables in a relational database system that are involved in a table query operation, each of said tables containing one or more records, and wherein said data modification operation is based on the position of a query position iterator with respect to each of said tables, the method comprising:

generating at query compile time, an iterator position retrieval function for each table involved in the query operation;

generating at query compile time, a data set modification function specific to each table involved in the query operation;

invoking at query execution time, each of said iterator retrieval functions until the iterator position retrieval function for a current open table returns the current position of said query execution iterator on that table; and invoking at query execution time, each of said data set modification functions until the data set modification function for said current open table performs a data set modification operation at the current position of said query execution iterator specified by said iterator position retrieval function.

3. The method of claim 2 wherein said iterator position retrieval functions are record-ID copy functions that are each specific to a single one of said tables.

4. The method of claim 3 wherein said data set modification functions are update/delete functions that are each specific to a single one of said tables.

5. The method of claim 4 wherein said tables are partitioned over one or more data processing nodes.

6. The method of claim 5 wherein said record-ID copy functions determine a current record and node position of a cursor, and wherein said method further includes a step at query compile time of generating a table queue for the nodes of each of said tables for transmitting data between the nodes of said tables, and wherein said current record and node position information returned by said record-ID copy functions is passed to said update/delete functions through table queues.

7. The method of claim 3 wherein said tables are partitioned over one or more data processing nodes.

8. The method of claim 2 wherein said tables are partitioned over one or more data processing nodes.

9. A database system for supporting a positioned data set modification operation on a partitioned data set involved in a data set query operation, in which the data set modification operation is based on the position of a query execution iterator and the data set is partitioned over two or more processing nodes into two or more data set partitions, the system comprising:

means for generating at query compile time, an iterator position retrieval function for each data set partition involved in a query operation;

means for generating at query compile time, a data set modification function specific to each data set partition involved in a query operation;

means for invoking at query execution time, each of said iterator retrieval functions until the iterator position retrieval function for a current open data set partition returns the current position of said query execution iterator on that data set partition; and means for invoking at query execution time, each of said data set modification functions until the data set modification function for said current open data set partition performs a data set modification operation at the current position of said query execution iterator specified by said iterator position retrieval function.

10. A system for supporting a positioned data modification on a union of tables in a relational database system that are involved in a table query operation, each of said tables containing one or more records, and wherein said data modification operation is based on the position of a query position iterator with respect to each of said tables, the system comprising:

means for generating at query compile time, an iterator position retrieval function for each data set partition involved in the query operation;

means for generating at query compile time, a data set modification function specific to each data set partition involved in the query operation;

means for invoking at query execution time, each of said iterator retrieval functions until the iterator position retrieval function for a current open data set partition returns the current position of said query execution iterator on that data set partition; and means for invoking at query execution time, each of said data set modification functions until the data set modification function for said current open data set partition performs a data set modification operation at the current position of said query execution iterator specified by said iterator position retrieval function.

11. The system of claim 10 wherein said iterator position retrieval functions are record-ID copy functions that are each specific to a single one of said tables.

12. The system of claim 11 wherein said data set modification functions are update/delete functions that are each specific to a single one of said tables.

13. The system of claim 12 wherein said tables are partitioned over one or more data processing nodes.

14. The system of claim 13 wherein said record-ID copy functions determine a current record and node position of a cursor, and wherein said system further includes means for generating, at query compile time, a table queue for the nodes of each of said tables for transmitting data between the nodes of said tables, and wherein said current record and node position information returned by said record-ID copy functions is passed to said update/delete functions through table queues.

15. The system of claim 11 wherein said tables are partitioned over one or more data processing nodes.

16. The system of claim 10 wherein said tables are partitioned over one or more data processing nodes.

17. A computer program product for use with a database system for supporting a positioned data set modification operation on a partitioned data set involved in a data set query operation, in which the data set modification operation is based on the position of a query execution iterator and the data set is partitioned over two or more processing nodes into two or more data set partitions, the computer program product comprising:

a recording medium;

means recorded on said recording medium for directing said database system to generate at query compile time, an iterator position retrieval function for each data set partition involved in a query operation;

means recorded on said recording medium for directing said database system to generate at query compile time, a data set modification function specific to each data set partition involved in a query operation;

means recorded on said recording medium for directing said database system to invoke at query execution time, each of said iterator retrieval functions until the iterator position retrieval function for a current open data set partition returns the current position of said query execution iterator on that data set partition; and means recorded on said recording medium for directing said database system to invoke at query execution time, each of said data set modification functions until the data set modification function for said current open data set partition performs a data set modification operation at the current position of said query execution iterator specified by said iterator position retrieval function.

18. A computer program product for use with a database system for supporting a positioned data set modification operation on a union of tables that are involved in a data set query operation, in which the data modification operation is based on the position of a query execution iterator with respect to each of said tables, the computer program product comprising:

generating at query compile time, an iterator position retrieval function for each table involved in the query operation;

generating at query compile time, a data set modification function specific to each table involved in the query operation;

invoking at query execution time, each of said iterator retrieval functions until the iterator position retrieval function for a current open table returns the current position of said query execution iterator on that table; and invoking at query execution time, each of said data set modification functions until the data set modification function for said current open table performs a data set modification operation at the current position of said query execution iterator specified by said iterator position retrieval function.

* * * * *